United States Patent
Palathingal

(10) Patent No.: US 6,527,399 B1
(45) Date of Patent: Mar. 4, 2003

(54) ALL-PLANAR BLIND-SPOT PROOF AUTOMOBILE SIDE-VIEW MIRROR

(76) Inventor: Jose Chakkoru Palathingal, 688 Taylor Ave., Oradell, NJ (US) 07649

(*) Notice: Subject to any disclaimer, the term of this patent is extended or adjusted under 35 U.S.C. 154(b) by 0 days.

(21) Appl. No.: 10/036,257

(22) Filed: Jan. 3, 2002

(51) Int. Cl.[7] .......................................... G02B 71/182
(52) U.S. Cl. ...................... 359/866; 359/867; 359/850; 359/851
(58) Field of Search ................................ 359/866, 867, 359/850, 851, 852, 855, 864, 865, 868, 871, 872, 883

(56) References Cited

U.S. PATENT DOCUMENTS

| | | | | |
|---|---|---|---|---|
| 4,674,849 A | * | 6/1987 | Stewart | 359/850 |
| 5,113,292 A | * | 5/1992 | Simson | 359/604 |
| 6,074,068 A | | 6/2000 | Palathingal | |
| 6,390,632 B1 | * | 5/2002 | Palathingal | 359/850 |
| 6,398,375 B1 | * | 6/2002 | Englander | 359/864 |
| 6,398,377 B1 | * | 6/2002 | Chou | 359/866 |

OTHER PUBLICATIONS

Jose C. Palathingal Blind–Spot Proof Automobile Side–View Mirror U.S. patent application, No. 09/707/818 filed on Nov. 7, 2000 (patent pending).

* cited by examiner

Primary Examiner—Mohammad Sikder

(57) ABSTRACT

A patent application is filed for an automobile side-view mirror that could avoid thousands of automobile accidents that could occur yearly on account of the well-known blind-spot hazard. The side-view mirror is a relatively low-cost item, and yet is a major contributor of automobile safety. The new device will cost substantially little more to fabricate than existing alternate devices, yet is devoid of the disadvantages inherent with the earlier devices. The new mirror is an integrated all-planar device which has no curvature and hence fully retains the distance perception of the auto driver. It provides the driver with a continuous side view of the road from close to the shoulder back toward the horizon. Contiguous images of extraneous vehicles can be seen, only one image for a given distance. Multiple reflections of light from points on the mirror are avoided. In mounting on the auto body, the new device introduces no hydrodynamical problem. It is versatile for use and esthetically appealing.

20 Claims, 4 Drawing Sheets

ALL-PLANAR BLIND-SPOT PROOF AUTOMOBILE SIDE-VIEW MIRROR

FIELD OF THE INVENTION

This invention is a device that eliminates the blind-spot hazard experienced by automobile drivers in the use of side-view mirrors in road traffic.

BACKGROUND OF THE INVENTION

With thousands of automobile accidents involving loss of life and property occurring every year on the crowded U.S. highways on account of the well-known blind-spot hazard, a side-view mirror devoid of the blind spot is a well recognized need of road safety. In the U.S. Pat. No. 6,390, 632 B1 issued on May 21, 2002 in favor of the present Applicant, Jose C. Palathingal, it is noted that, for a left side-view mirror of the typical size, the road distance on the left of a car driver roughly 5' to 30' behind the driver may be defined as the so-called blind spot. Eliminating the problem of the blind spot is compounded by a number of requirements which have been delaying an entirely satisfactory solution; examples, good hydrodynamics of mounting, undistorted field of view, correct distance perception, good esthetics, low cost, etc. A device had been patented earlier by the present Applicant vide U.S. Pat. No. 6,074,068 dated Jun. 13, 2000. However, the rear and front surfaces of the reflecting elements of this device and of the device of the pending patent application cited above are not parallel, the front of the mirror being inclined to the silvered rear surface; and hence two separate distinguishable reflections of the headlights of an extraneous vehicle occur during night time, one from the smooth glass front and the other from the silvered rear. A driver thus sees twin images of each of the headlights of an extraneous vehicle during night time driving. Moreover, since in several embodiments of the said earlier devices, a single sector of the mirror may be composed of more than one series of reflecting elements of distinct orientations, the mirror can present for any one particular section of the road two or more mutually shifted views. This may cause confusion to some auto drivers at all hours of driving especially on a major multilane highway. Also, the image seen by the driver by reflection of light in any one particular direction by any one series of parallel reflecting elements is not contiguous in such cases, but formed of a series of parallel stripes with discontinuities in between. The mirror of the present invention is designed to avoid all these disadvantages and, as the Applicant has observed through road studies employing working models of the various devices, is a major improvement over these earlier devices. In avoiding the aforesaid problems, the present side-view mirror has been designed to meet five specific requirements; (i) contiguous road view of the rear left, 5' to infinity (horizon) on a level road shall be made possible, (ii) each mirror element shall be planar, and have the front and rear surfaces parallel, (iii) each sector of the mirror assigned for view of a particular section of the road shall cause reflection of light originating from the specific road section in only one direction toward the eye of the driver, (iv) in the vertically mounted normal orientation of the mirror, the reflector elements that comprise each sector shall together cover the total horizontal dimension (width) of the sector without discontinuity so that the sector shall present a contiguous field of view to the driver, and (v) no curvature shall be present in the arraignment of the reflective elements.

SUMMARY OF THE INVENTION

The present invention comprises of a back support and a mirror assembly having two sectors, a planar first sector, and a saw-toothed second sector. The first sector shall have features of a conventional planar mirror, a planar front and a planar rear, both surfaces mutually parallel. The rear surface is reflective. The second sector is composed of a series of planar mirror strips arraigned over the back support parallel among themselves with the reflective surfaces in the rear. These mirror strips also have front and rear surfaces parallel, and are all inclined to the front surface of the first sector at a small predetermined angle $\alpha$. The spaces intervening between the front surfaces of adjacent mirror strips are narrow surface strips positioned between neighbor edge lines of the front surfaces of the mirror strips, approximately perpendicular to the front surface of the first sector. Thus, the front surface of the second sector is presented with a saw-toothed contour, made up of two series of surface strips; a first series representing the front surfaces of the mirror strips and a second series comprising the intervening surface strips. The planar surfaces of the first series are preferably of identical size and shape, preferably rectangular. The intervening surface strips of the second series are preferably planar, of identical size and shape, preferably rectangular, and mutually parallel. The front surfaces of the mirror assembly whereon light is incident are transparent and refractive, and are covered, in some embodiments, with a transparent sheet or coating that acts as a protective sealant.

BRIEF DESCRIPTION OF THE DRAWINGS

FIG. 2(a) is a drawing (not to scale) of a horizontal cross section of the first sector of an embodiment of the mirror of the invention mounted vertically, in which the mirror plate of the first sector and the mirror strips of the second sector are of non-transparent material or materials; the front surfaces of the two sectors are polished or are reflector-coated to function mirror-like.

DETAILED DESCRIPTION OF A PREFERRED EMBODIMENT

Figure 1A:
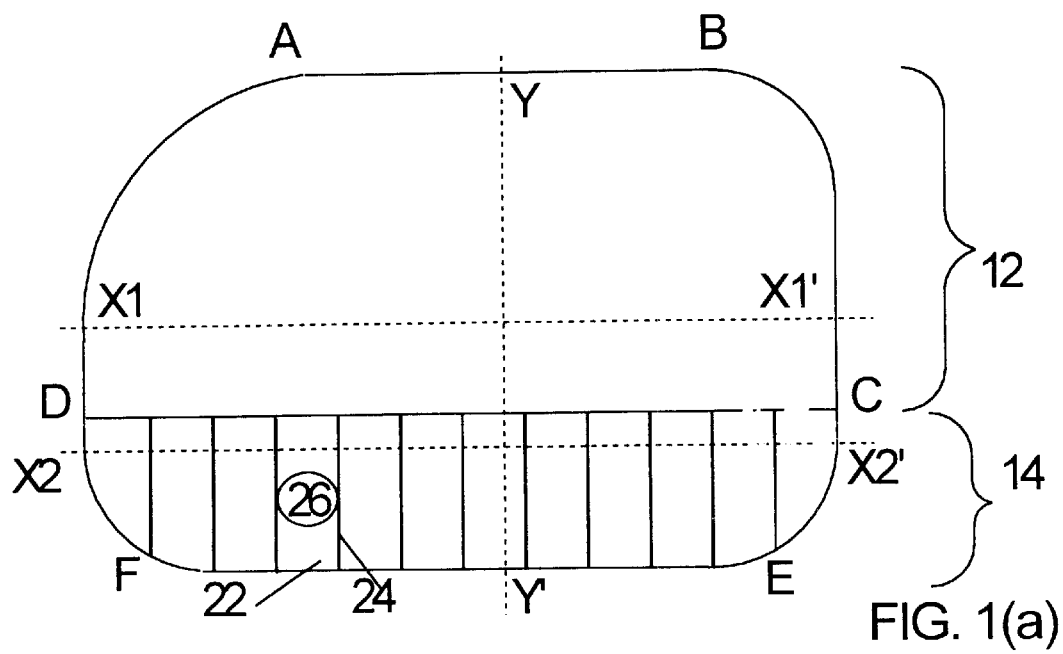
FIG. 1(a) is a planar view (not to scale) of the frontal surface of a preferred embodiment of the mirror of the invention, illustrating the planar first sector ABCD and the saw-toothed second sector DCEF comprised of mutually parallel planar mirror strips intercepted by nearly perpendicular surface strips.
Figure 1B:
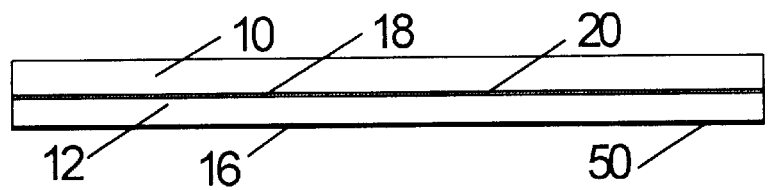
FIG. 1(b) illustrates a cross section of the first sector of the mirror of FIG. 1(a), drawn across line $X_1X_1'$.
Figure 1C:
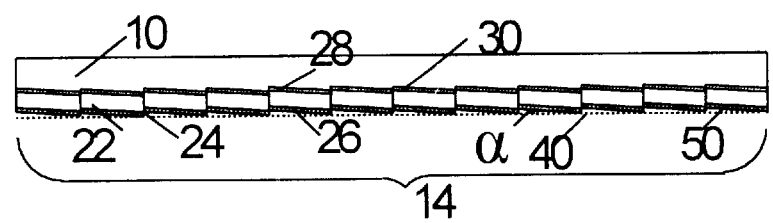
FIG. 1(c) represents a cross section of the second sector of the mirror of FIG. 1(a), drawn across line $X_2X_2'$.
Figure 1D:
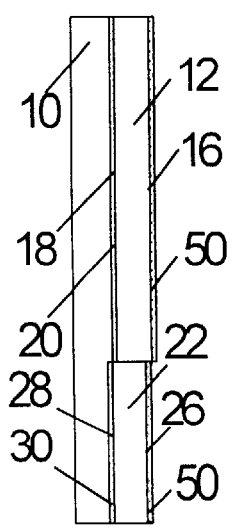
FIG. 1(d) shows a cross section of the mirror of FIG. 1(a) drawn across line YY'.

In a preferred embodiment, illustrated by FIGS. 1(a), 1(b), 1(c), and 1(d), the mirror of the invention comprises of a back support 10 and a mirror assembly that is grossly rectangular. While mounted vertically, the mirror shall measure roughly 6" horizontally (width), and 4" vertically (height). The preferred mirror material is glass, of thickness approximately between 1/16" and 1/8". The mirror assembly shall be of two sectors, a first sector 12 (drawn ABCD) and a second sector 14 (drawn DCEF), both extending horizontally across the full width of the mirror. The first sector forms a conventional planar mirror, with front surface 16 and rear surface 18 mutually parallel as shown in FIGS. 1(b) and 1(d). The rear surface is reflector-coated, with reflector material marked 20. The second sector has a saw-toothed contour in the front and in the rear, composed of the surfaces of a contiguous series of identical saw-tooth elements, as presented in FIG. 1(c). The saw-tooth element comprises of a planar mirror strip 22 inclined at a small angle a to the frontal surface of the first sector and a surface strip 24 covering the narrow area between the edge lines of consecutive mirror strips, approximately perpendicular to the frontal surface of the first sector. The front surfaces 26 and the rear surfaces 28 of the mirror strips 22 are planar and mutually parallel. The rear surfaces 28 are reflective, being coated with a reflective material 30. In the preferred embodiment, the angle of inclination of the planar mirror strips 22 to the front surface 16 of the first sector, a is approximately 6°. Each of these mirror strips has a horizontal width approximately 0.5". It is seen from the above that the preferred embodiment of the mirror of the invention is comprised of twelve saw-tooth elements. The mirror strips are expected to cover the entire width of the mirror of the invention without interruption. The frontal plane 40 containing the lines of intersection between the front surfaces 26 of the mirror strips 22 and the surface strips 24 is parallel to the planar frontal surface 16 of the first sector. In the preferred embodiment the first sector shall have height approximately 70% the height of the mirror assembly while mounted vertically.

The mirror assembly is provided with the back support 10 for protection and strength, and in the preferred embodiment also serves as a base for mounting the planar mirror plate of the first sector and the mirror strips of the lower sector. The mounting can be done by any mechanically viable means, such as gluing to the back support or snapping into a groove in the back support. The back support may comprise of a plurality of sheets or components of one or more materials. The surface of the back support in contact with the reflective coatings of the mirror assembly shall be chemically non-reactive and non-abrasive with the reflector material. In some embodiments of the invention, the front surface of the mirror assembly is provided with a cover sheet or coat 50 for protection of the refractive mirror front. The cover sheet can also be effective as a sealant for the mirror assembly.

Figure 2A:
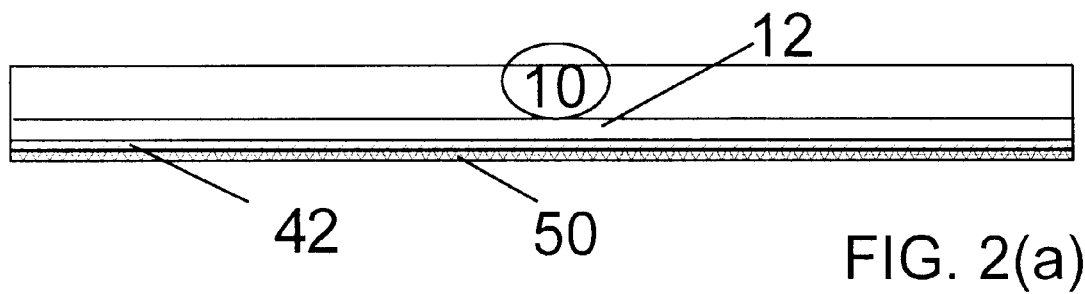
Figure 2B:
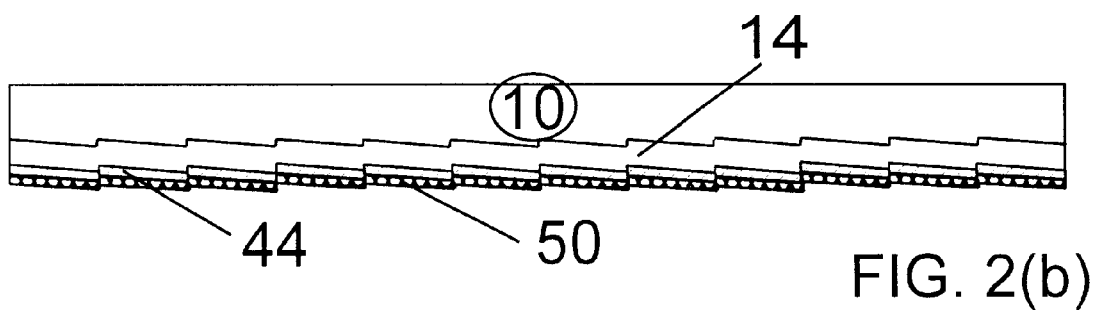
FIG. 2(b) illustrates a horizontal cross section of the second sector of the embodiment of the mirror of the invention represented by FIG. 2(a) mounted vertically.
Figure 2C:
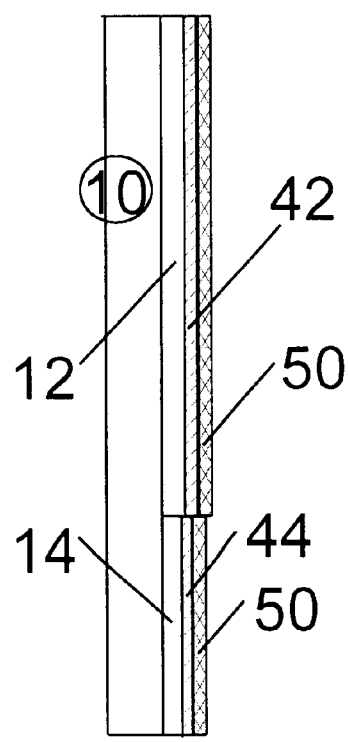
FIG. 2(c) shows a drawing of a vertical cross section of the embodiment of the mirror of the invention represented by FIGS. 2(a) and 2(b), mounted vertically.
Figure 4:
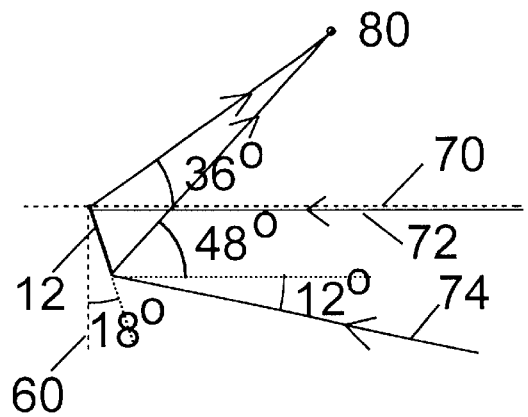
FIG. 4(a) illustrates, for the first sector of the mirror of the invention, the angular range of reflection of light originating from the road that are directed by reflection toward the driver eye. The mirror is fixed on the auto in the orientation of normal use.
FIG. 4(b) illustrates, for the second sector of the mirror of the invention, the angular range of reflection of light originating from the road that are directed by reflection toward the driver eye. The mirror is fixed on the auto in the orientation of normal use.
FIG. 4(c) illustrates the functioning of the mirror of the present invention in eliminating the blind spot.
Figure 4:
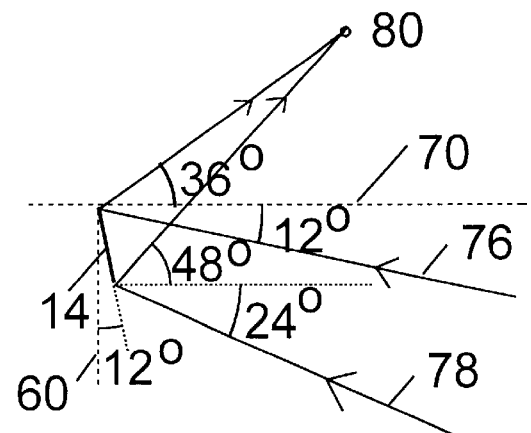
Figure 4:
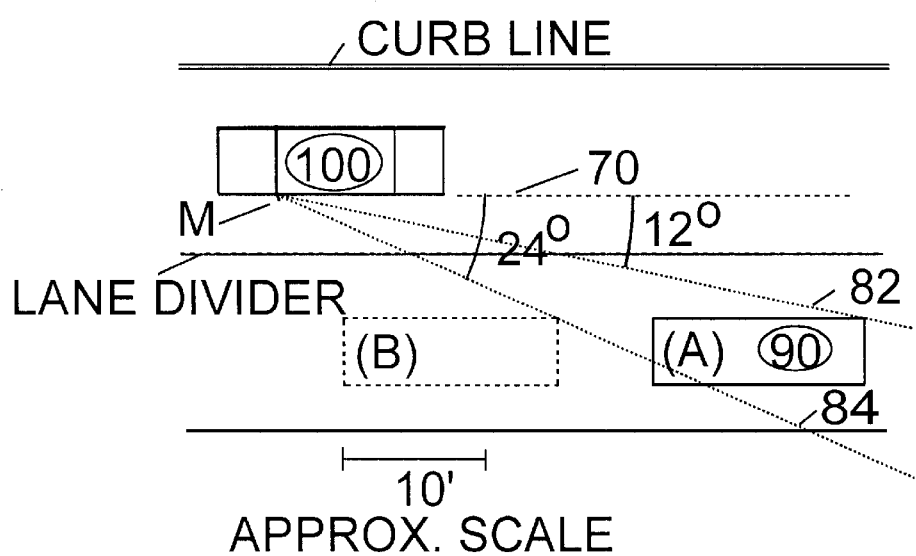

The functioning of the mirror of the present invention is now explained. In the preferred mode of use, the mirror is mounted on the auto body vertically for left-side view with the sector having the majority height of the mirror positioned as the upper sector. Thus, in the use of the preferred embodiment described above, the single-planar first sector 12 of the mirror assembly forms the upper sector and the saw-toothed second sector 14 is the lower sector. The mirror, marked M in FIG. 4(c) is so fixed that the upper sector 12 presented in FIG. 4(a) has the same orientation on the auto body that a conventional planar side-view mirror would; with its plane presumed to be approximately at 18° to the vertical plane of the auto front, marked by line 60. In this orientation, ray of light 72 traveling parallel to line 70 representing the vertical plane covering the left side of the auto, and ray 74 at 12° to line 70 represent the extreme directions of light that can be reflected, for the aforesaid mirror orientation, in the range of directions between 36° and 48° to line 70. These directions are presumed to lead to the driver eye 80 for a typical driver position. (For simplicity, only one driver eye is considered). Reflection of light from the lower sector 14 is illustrated by FIG. 4(b). It shows that the lower sector of the mirror, having its plane oriented nearly vertically at 12° to the vertical auto front plane 60 reflects rays 76 and 78 incident along directions 12° and 24°respectively to line 70 into the driver eye 80. It is hence seen that whereas a conventional planar side-view mirror presents to the auto driver a directional range of view 0° to 12° relative to the left side of the auto, the mirror of the invention provides an enhanced directional range 0° to 24°, with its two sectors combined. The directional range within 12° and 24°, bordered by lines 82 and 84 of FIG. 4(c) covers the blind spot. As regards the distance ranges covered by the two sectors, the Applicant observed through road studies (as noted in the patent application Ser. No. 09/707,818 dated Nov. 07, 2000 referred to above) that the upper 70% of the height of the mirror shall enable a view of the road farther than approximately 80' behind, extendinlg toward the horizon. Rays of light originating from a point in this distance range on the road will be reflected from the upper sector in the directional range 36° to 48° relative to the left side of the auto and be directed toward the eye of the auto driver. The lower sector is now so oriented that it reflects light from the road region in the distance range, 80' to 5' in directions between 36° to 48° to the left side of the auto, also directed toward the driver eye. Thus, as shown in FIG. 4(c), an extraneous vehicle 90 approaching from a large rear distance is seen by the driver of the primary auto 100 (fitted with the mirror of the invention) in the upper sector of the auto mirror while the extraneous vehicle is at a distance roughly 80' or larger. Auto 90 is seen by the driver of auto 100 in the lower sector as 90 enters the distance region within about 80', and advances from position (A) in the blind spot toward the forward position (B). At a 5' distance the extraneous vehicle is well seen by the driver of the primary auto through peripheral vision. The problem of the blind spot is thus eliminated. For reasons stated above, only one image of the extraneous auto is generated that can be visible to the driver of the primary auto during day or night for any particular road distance; and the image is fully contiguous. Since only planar mirror components constitute the reflecting assembly, and no curvature is involved, the viewer maintains the correct distance perception. The mirror can be built alternately with a non-transparent material such as a metal. An embodiment of such a mirror is illustrated by FIGS. 2(a), 2(b) and 2(c). The first sector 12 is a planar sheet polished in the front for reflection or reflector-coated 42. The second sector 14 consists of a saw-toothed sheet, of which also the front is well polished or reflector-coated 44. A protective cover 50 of a transparent material, preferably a sheet or a coat is positioned in the front over the frontal reflective surface in physical contact with the surface.

In the descriptions above, the mirror of the invention has been cited for left-side view, but embodiments with minor alteration, example, reverse inclinations of the mirror strips comprising the second sector, can function as a right-side view mirror. Also rear-view mirrors can be devised by various possible combinations of left-view embodiments, right-view embodiments and conventional planar mirrors.

Figure 3:
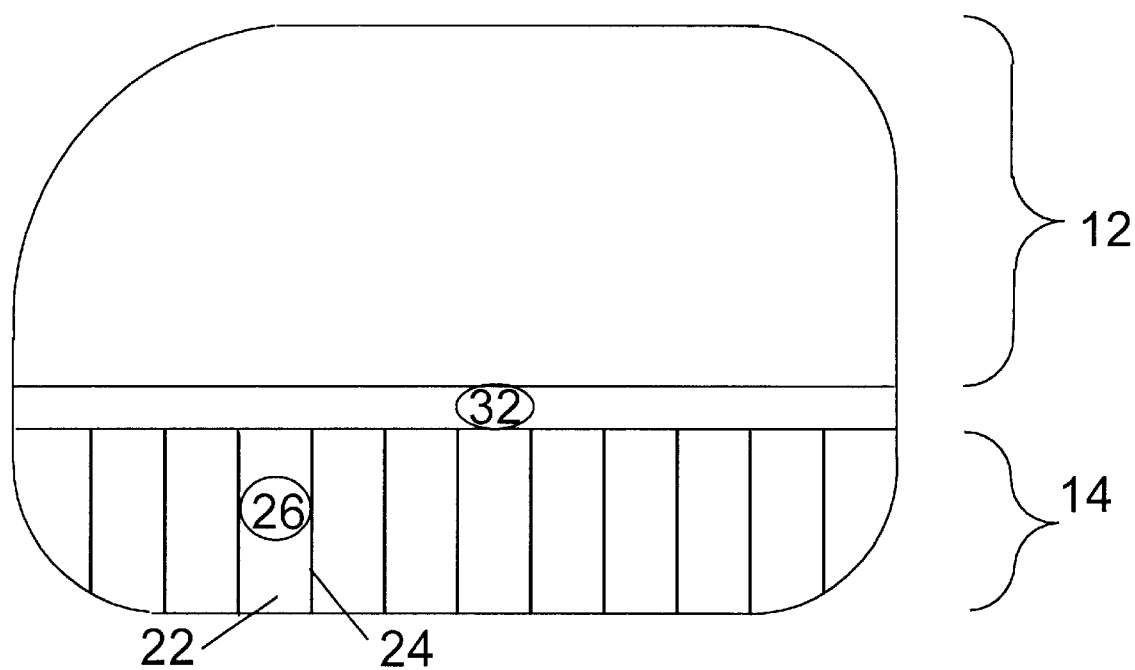
FIG. 3 is a planar view of the front surface of an embodiment of the mirror of the invention, in which a nonreflective strip separates the planar first sector and the saw-toothed second sector of the mirror assembly.

Several modifications of the invention can be divined by those proficient in the art, but should be considered to be within the scope of the present invention. For example, the outline shapes of the mirror assembly and the individual mirror components can be different, and the materials used can differ. Embodiments are possible which, while mounted vertically, have the upper sector saw-toothed and the lower sector planar. In various embodiments, the sectors of the mirror can be of different relative proportions of area, and the saw-toothed sector could cover surface area larger than the planar sector It is also possible to have embodiments in which the first sector and the second sector of the mirror assembly are separated by a strip 32 of a nonreflective material as illustrated in FIG. 3. The number of saw-tooth elements of the saw-toothed second sector can vary. The two mirror sectors may be made of the same one or a plurality of materials; transparent, non-transparent or both. The surface strips intervening among the planar mirror strips of the second sector could be planar or slightly curved without causing any substantial break in the field of view of the second sector. These intervening surface strips may be polished for reflection or be reflector-coated so as to serve together as a side reflector of the primary auto for observation by drivers of extraneous vehicles.

I claim:

1. A side-view mirror for automobiles comprised of
   (i) a back support, and
   (ii) a mirror assembly, comprising a planar first sector and a saw-toothed second sector,
      the first sector comprising a mirror plate of a transparent material, having a planar transparent front surface and a planar rear surface parallel to the planar front and coated with a reflective material,
      the second sector comprised of a contiguous series of a plurality of saw-tooth elements, each saw-tooth element comprising a planar mirror strip of a transparent material, and a surface strip joined to the front surface of the planar mirror strip along an edge line,
      the planar mirror strip having a transparent planar front surface and a reflective planar rear surface parallel to the planar front and coated with a reflective material,
      the planar mirror strip being oriented with its front surface at a predetermined small angle α to the frontal plane of the first sector,
      the surface strip adjoining the frontal surface of the planar mirror strip oriented approximately perpendicular to the planar front surface of the first sector,
      the line of intersection between the front surface of the planar mirror strip and the adjoining surface strip oriented parallel to the frontal planar surface of the first sector.

2. A mirror of claim 1 wherein the first sector and the second sector of the mirror assembly are approximately rectangular.

3. A mirror of claim 2 in which the planar mirror strips of the second sector are approximately identical.

4. A mirror of claim 3, wherein the saw-tooth elements of the second sector are approximately identical.

5. A mirror of claim 1 wherein the small predetermined angle, α is between 3° and 9°.

6. A mirror of claim 1 wherein the first sector and the second sector extend nearly across the full horizontal dimension of the mirror surface while the mirror is mounted vertically.

7. A mirror of claim 6 wherein the planar first sector covers approximately 70% the surface area of the mirror assembly.

8. A mirror of claim 1 wherein the back support and the mirror assembly are mounted inside a cover box.

9. A mirror of claim 8 wherein the back support and the mirror assembly can be rotated inside the cover box.

10. A mirror of claim 1 in which a transparent front cover is provided in the front of the mirror assembly whereon light is incident.

11. The mirror of claim 1 wherein the number of saw-tooth elements comprising the second sector is between 4 and 24.

12. A mirror of claim 1 wherein a narrow nonreflective strip separates the first sector and the second sector.

13. A mirror of claim 1 in which the surface strips adjoining the frontal surfaces of mirror strips of the second sector are made reflective for incident light.

14. A mirror of claim 6 wherein the planar first sector covers approximately 30% surface area of the mirror assembly.

15. A side-view mirror for automobiles comprising,
   (i) a back support
   (ii) a mirror assembly, comprising a first sector and a second sector, and
   (iii) a transparent front cover;
      the first sector of the mirror assembly comprising a planar mirror plate,
      the second sector comprising a saw-toothed mirror plate,
      the first sector and the second sector having the front surfaces reflective for incident light,
      the first sector and the second sector approximately rectangular,
      the second sector comprised of a contiguous series of a plurality of saw-tooth elements,
      the saw-tooth element comprised of a nearly rectangular reflective planar first surface and an adjoining nearly rectangular second surface,
      the first surface of each saw-tooth element inclined to the planar front surface of the first sector at a small predetermined angle a,
      the second surface of each saw-tooth element being approximately perpendicular to the planar front surface of the first sector,
      the line of intersection between the reflective first surface and the adjoining second surface of the saw-tooth element oriented parallel to the frontal planar surface of the first sector.

16. A mirror of claim 15 wherein the saw-tooth elements of the second sector are nearly identical.

17. A mirror of claim 15 wherein the number of saw-tooth elements of the second sector is between 4 and 24.

18. A mirror of claim 15 wherein the first sector and the second sector are separated by a narrow nonreflective strip.

19. A mirror of claim 15 wherein the planar first sector covers approximately 70% surface area of the mirror assembly.

20. A mirror of claim 15 wherein the planar first sector covers approximately 30% surface area of the mirror assembly.

* * * * *